(12) United States Patent
Pothireddy

(10) Patent No.: US 8,316,187 B2
(45) Date of Patent: Nov. 20, 2012

(54) CACHE MEMORY INCLUDING A PREDICT BUFFER

(75) Inventor: Anil Pothireddy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/169,091

(22) Filed: Jul. 8, 2008

(65) Prior Publication Data
US 2010/0011169 A1    Jan. 14, 2010

(51) Int. Cl.
*G06F 12/00* (2006.01)
(52) U.S. Cl. .. 711/137; 711/123; 711/117; 711/E12.052
(58) Field of Classification Search .......... None
See application file for complete search history.

(56) References Cited

U.S. PATENT DOCUMENTS

| | | | |
|---|---|---|---|
| 5,410,653 A * | 4/1995 | Macon et al. ................ | 711/137 |
| 6,988,169 B2 | 1/2006 | Burger et al. | |
| 2003/0154349 A1 | 8/2003 | Berg et al. | |
| 2004/0049640 A1 * | 3/2004 | So et al. ...................... | 711/137 |
| 2005/0154836 A1 * | 7/2005 | Steely et al. ................ | 711/137 |

* cited by examiner

*Primary Examiner* — Yaima Campos
*Assistant Examiner* — Thanh D Vo
(74) *Attorney, Agent, or Firm* — Grant A. Johnson; Owen J. Gamon

(57) ABSTRACT

Disclosed is a cache memory, design structure, and corresponding method for improving cache performance comprising one or more cache lines of equal size, each cache line adapted to store a cache block of data from a main memory in response to an access request from a processor; and a predict buffer, of size equal to the size of the cache lines, configured to store a next block of data from said main memory in response to a predict-fetch signal generated using at least one previous access request.

8 Claims, 6 Drawing Sheets

CACHE MEMORY INCLUDING A PREDICT BUFFER

FIELD OF THE INVENTION

The present invention relates generally to caching and, in particular, to a cache memory, design structure, and corresponding method for improving cache performance.

BACKGROUND

Processors in present-day computer systems were designed for compute-intensive operations, but present day applications demand a lot of memory accesses. There is a need to improve memory transaction operations (e.g. read and write), which are a bottleneck to a system's performance. For example, in conventional pipelined processor architectures, the number of clock cycles per instruction (CPI) is close to 1 for most instructions with the exception of Load/Store (memory transactions).

A cache 120, as illustrated in FIG. 1a, is a small and fast memory that holds recently used pieces of data from the main memory 140 of a system 100, for example a computer system, a portable electronic device, a handheld device and the like. A processor 110 initiates a memory read/write transaction from/to the main memory 140 by placing a request, containing an address, on a memory bus. The request is processed by the cache 120 and if the data is present in the cache 120 (a cache hit) the request is quickly processed, and alternatively if the data is not present in the cache 120 (a cache miss), a unit of data called a cache block, containing the requested data, is fetched from the main memory 140 and placed in the cache 120. The memory controller 135 facilitates the data movement to and from the main memory 140. A TAG is a portion of the request address that uniquely identifies a cache block containing the requested data, and is used by the cache 120 to quickly determine whether a request generates a hit or a miss.

There is only limited area available on the processor chip for cache memory. As illustrated in FIG. 1b, the cache memory 120 is divided into lines, e.g. 130, each line being configured to store a block of data of equal size. The block is the unit of information transferred between the cache 120 and the main memory 140. However in most cases the processor 110 only reads/writes data of a size equivalent to the size of its registers 115 from/to the cache 120. The block size is therefore a multiple of the processor register size (one word).

Cache design is based on the principle of locality:
Temporal locality (locality in time)—If an item is referenced it will tend to be referenced again soon.
Spatial locality (locality in space)—If an item is referenced, items whose addresses are close by will tend to be referenced soon.

The idea of having a cache block (i.e. cache 'length' greater than one data word) is derived from the principle of spatial locality, and the idea of having multiple blocks (i.e. cache 'depth' greater than one line) is derived from the principle of temporal locality, as illustrated in FIG. 1b.

Spatial locality would require the cache block size to be as large as possible, and temporal locality would require the cache to have as many blocks as possible. There is a need to strike a balance between these two requirements for a given area of cache memory. Hence for a given area, a cache memory aspect ratio (length vs depth) is decided as a compromise between the principles of locality that is appropriate for the particular process(es) being run on the processor.

The common way to avoid cache misses in sequential read/write access is to increase the cache block size. But if the cache block size is (say) doubled to avoid frequent cache misses occurring during a sequential access, the number of blocks able to be stored is halved (thus impacting the principle of temporal locality). Alternatively, if the cache block size is doubled while keeping the number of blocks able to be stored constant, then the cache area will have to be doubled. This is undesirable.

SUMMARY

Disclosed are arrangements which seek to address the above problems by using a prediction method to enable a 'predict-fetch' mechanism. The prediction method monitors the processor request address for a number of consecutive hits to the same cache block to predict a sequential read/write by the processor and thus trigger a predict-fetch of the next cache block (if it is not already present in the cache). Such predict-fetched data will not replace a stored cache block, but will be stored in a predict buffer, which is a part of the cache reserved for the predict-fetched data, and has size equal to that of each cache line.

The prediction method compares the TAG of the request with the TAG of the predict buffer whenever a miss is generated. If the predict buffer has the requested data in it, the data is moved to a cache line to which a conventional replacement algorithm points. The predict buffer then indicates its data to be invalid.

The disclosed arrangements relate to a single processor, single thread configuration with a limited area available for the cache. This configuration is found in all low power system-on-chip designs that use embedded processors, and in some desktop/laptop computers.

According to a first aspect of the present disclosure, there is provided a cache memory comprising one or more cache lines of equal size, each cache line adapted to store a cache block of data from a main memory in response to an access request from a processor; and a predict buffer, of size equal to the size of the cache lines, configured to store a next block of data from the main memory in response to a predict-fetch signal generated using at least one previous access request.

According to a further aspect of the present disclosure, there is provided a method of storing a block of data in a cache memory, said method comprising comparing a number of successive cache hits generated by access requests from a processor to the same cache block already stored within the cache memory with a predetermined threshold, and storing, based on the comparison, a next block of data from a main memory in the cache memory, the next block having an address next to the address of the same cache block in the main memory.

Further aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION INCLUDING BEST MODE

Figure 1A:
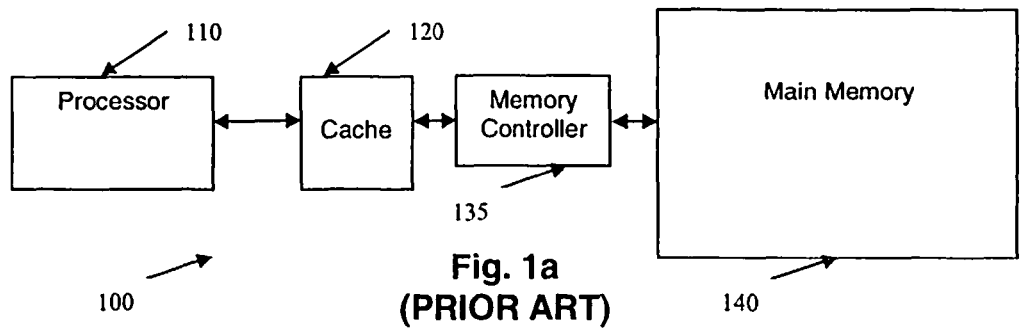
FIG. 1a shows an architecture for an interface between a processor and a main memory, incorporating a cache.

Where reference is made in any one or more of the accompanying drawings to steps and/or features, which have the same reference numerals, those steps and/or features have for the purposes of this description the same function(s) or operation(s), unless the contrary intention appears.

Figure 1B:
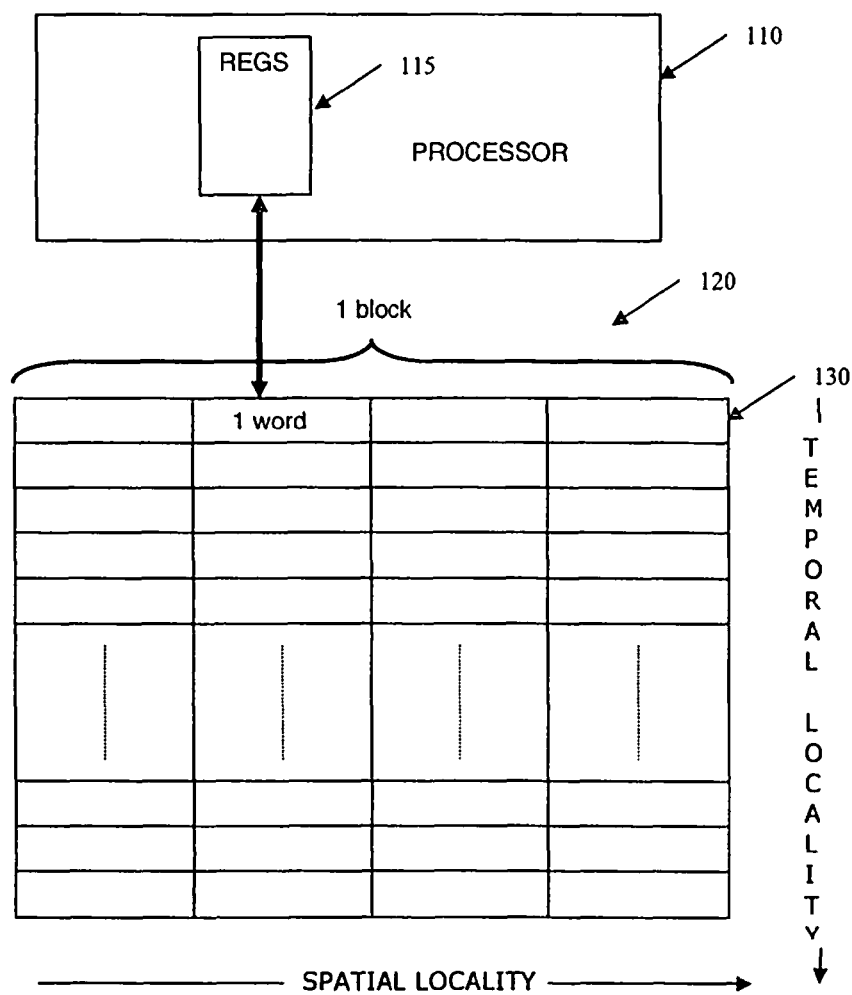
FIG. 1b shows the cache of FIG. 1a in more detail.
Figure 2:
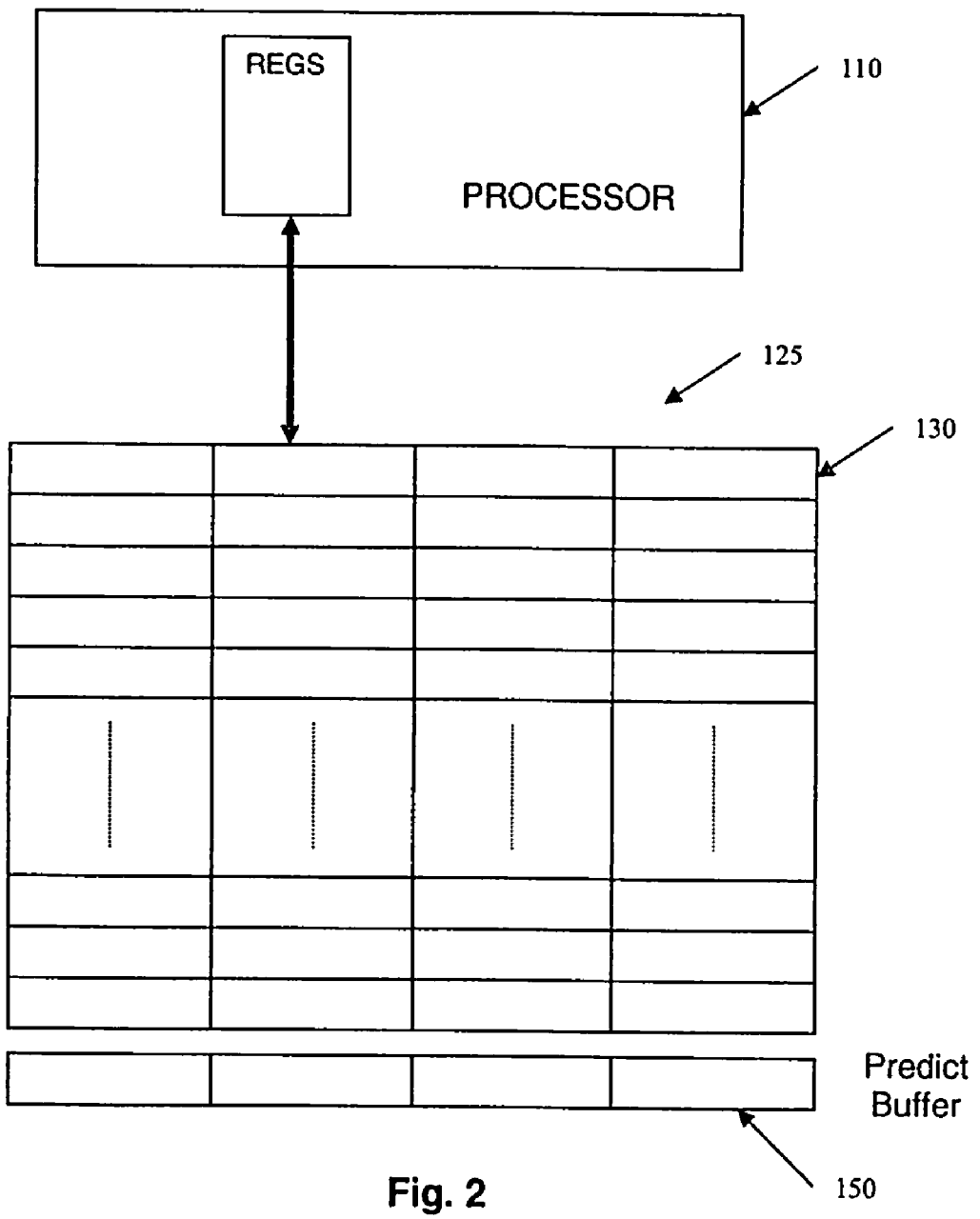
FIG. 2 shows a cache according to a first embodiment of the present invention.

FIG. 2 shows a cache 125 according to a first embodiment of the present invention. The cache 125 is structured in the same manner as the cache 120 in FIG. 1b, but with an additional buffer called the predict buffer 150, of size equal to that of each cache line 130. The predict buffer 150 is configured to store a block of data fetched from the main memory 140 in response to a prediction method that monitors the TAG of each block in the cache 125 accessed by the processor 110. If the number of consecutive requests accessing the current cache block reaches a predetermined threshold, it may be assumed that the consecutive requests represent a sequential read/write access by the processor 110, and therefore predicted that the next block of memory (with TAG one greater than the current TAG) will soon be requested by the processor 110. If the next block is not present in the cache 125, it is fetched from the main memory 140 and stored in the predict buffer 150 in an operation referred to herein as a predict-fetch. When the processor 110 finishes processing the current block and tries to access data in the next block, a miss that would otherwise have occurred is averted, since the next block data is available in the predict buffer 150 and can be used right away. It should be noted that always fetching the next cache block without any prediction method may lead to wastage of a significant portion of main memory bandwidth, since not all read/write requests form part of a sequential access.

Figure 3:
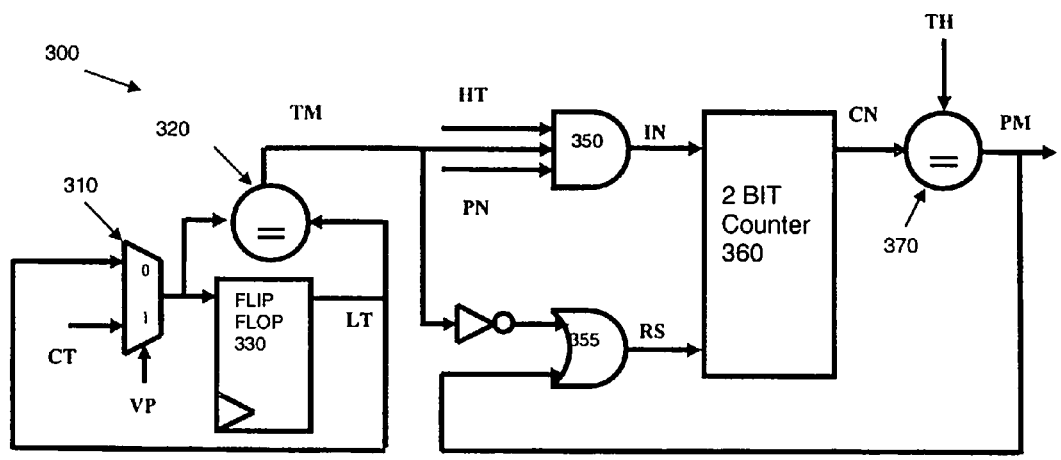
FIG. 3 shows a circuit implementing the prediction method according to the first embodiment of the present invention.

FIG. 3 shows a circuit 300 implementing the prediction method according to the first embodiment of the present invention. The two-letter labels refer to signals defined as follows:

CT: Current Tag, the TAG of the current read/write request
VP: Valid Processor Memory request, to qualify CT
LT: Previous Tag, i.e. the TAG of the previous read/write request
TM: Tag Matched, i.e. the last two requests have the same TAG
HT: Current request generated a hit, to qualify TM
PN: Predict-fetch Needed indication signal (see FIG. 5)
IN: Increment the counter signal
RS: Reset the counter signal
CN: Counter value
TH: Threshold Value for comparison, to enable predict-fetch
PM: Predict-fetch from Memory signal, indicates threshold reached.

The tag of the previous request (LT) is saved in a set of flip-flops 330 and is compared at comparator 320 with the current tag (CT) of a valid processor request (VP). When VP is not asserted, multiplexer 310, to which VP forms the selection input, selects its other input (LT) to be passed to the comparator 320. If the two tags match (TM=1) and the current request generated a cache hit (HT) and the predict-fetch conditions are satisfied (PN) (see FIG. 5) (IN output from AND gate 350=1), then the value CN of 2-bit counter 360 is incremented. Alternatively, if the tags do not match (TM=0) or if a predict-fetch from memory (PM) is in progress (RS output from OR gate 355=1), the counter value (CN) is reset. The counter value at any given point of time is an indication of the number of successive hits to a given cache block. The counter value (CN) is compared to a predetermined threshold value (TH) at comparator 370, and when the compared values are equal, the predict-fetch memory signal PM is asserted. Since counter 360 is two bits, the maximum value of TH is three, but additional counter bits would allow a larger threshold TH to be used. The threshold value TH may be fixed (typically to a value between 3 and 6) or may be varied based on observations made during the execution of programs on the system 100. The chosen threshold should not be so small that false predictions of sequentiality are made too often, nor so high that the predict-fetch process is needlessly delayed. After the predict-fetch from main memory 140 is signalled via PM, the cache 125 requests the data for the cache block with a tag value (CT+1) from main memory 140.

Figure 4:
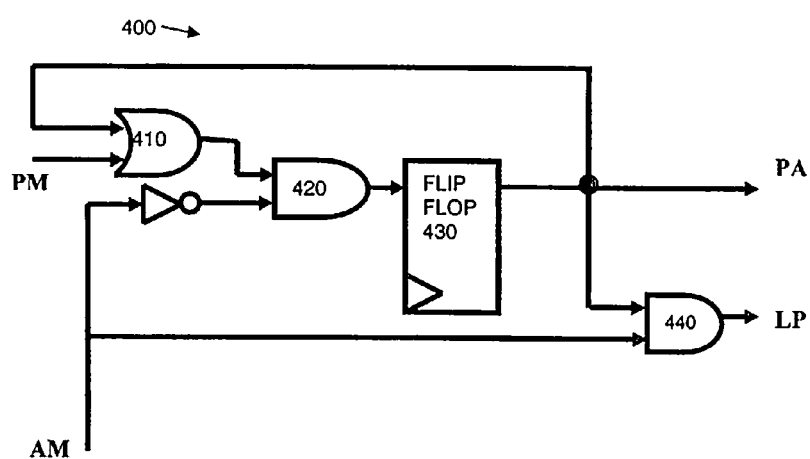
FIG. 4 shows a circuit for the generation of the Load-Predict fetch buffer signal, as used in FIG. 6.

FIG. 4 shows a circuit 400 to generate a load predict buffer (LP) signal that enables the predict-fetched data to be loaded into the predict buffer 150 according to the first embodiment. The circuit 400 also generates another signal, predict-fetch active (PA), to indicate the predict-fetch action is in progress (for use in FIG. 5). AM is an Acknowledge from main memory 140, indicating main memory 140 has completed the request. PA and PM are fed to OR gate 410 which asserts the input to the flip-flop 430 as long as AM is not asserted, as determined by AND gate 420. LP is asserted if AM is asserted and the flip-flop 430 output (PA) is 1, as determined by AND gate 440.

There are certain conditions under which a predict-fetch should be disabled:

1. When the next cache block is already in the cache memory 125.
2. When the next cache block is already predict-fetched and is in predict buffer 150.
3. When a predict-fetch operation is in process.

Figure 5:
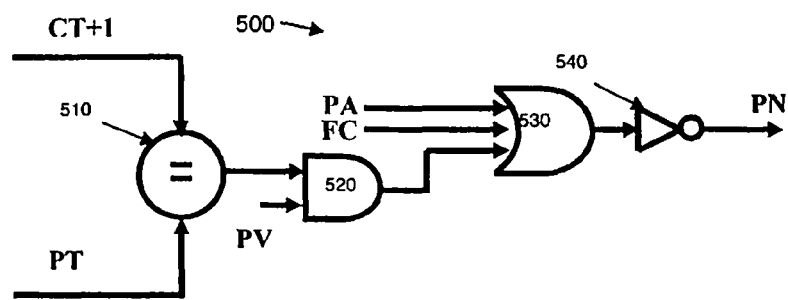
FIG. 5 shows a circuit for the generation of the Predict-fetch Needed signal, as used in FIG. 3.

The Predict-fetch Needed (PN) signal used by AND gate 350 in circuit 300 to enable predict-fetch is generated when none of the above three conditions is true. FIG. 5 shows a circuit 500 to generate signal PN according to the first embodiment. In FIG. 5:

PT: Predict buffer Tag, the TAG associated with the data in predict buffer 150 (see FIG. 7 below)
CT+1: Current Tag (see FIG. 3) plus one, i.e. the TAG of the next cache block PV: Predict buffer Valid, the Valid signal associated with predict buffer 150 (see FIG. 6 below)
PA: Predict-fetch Active (see FIG. 4)
FC: Found in cache, i.e. the next block (with TAG CT+1) is found in one of the lines of cache 125. This signal is generated by the cache 125 by performing a search of the TAGs of the blocks stored in the cache, according to the known manner of operation of conventional caches.

In circuit 500, CT+1 and PT are compared by comparator 510. If they are the same, and PV is asserted indicating the predict buffer data is valid (as determined by AND gate 520), condition 2 above holds. The output of AND gate 520 is passed to three-input OR gate 530 along with FC (indicating condition 1 above holds) and PA (indicating condition 3 above holds). PN is the output of OR gate 530, inverted by inverter 540.

The predict buffer 150 has three fields:
1. Predict buffer Valid: to indicate the data in the predict buffer 150 is valid;
2. Predict buffer Tag: to hold the TAG that corresponds to the predict-fetched data;
3. Predict buffer Data: to hold the predict-fetched data.

Figure 6:
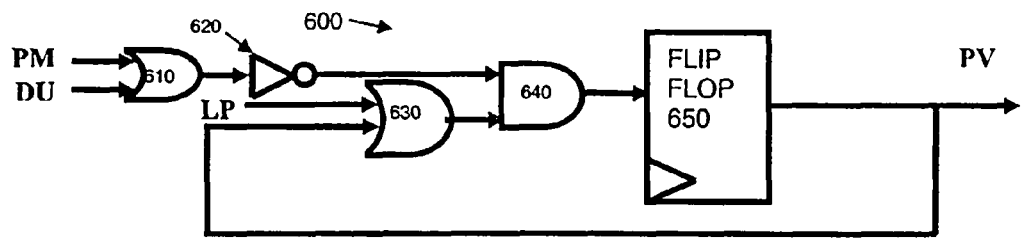
FIG. 6 shows a circuit for the generation of the Predict buffer Valid signal, as used in FIG. 5.
Figure 7:
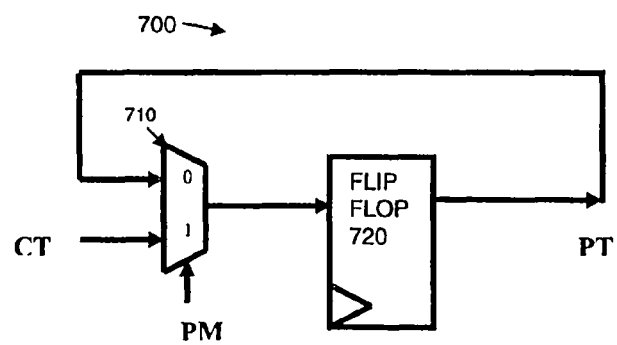
FIG. 7 shows a circuit for the generation of the Predict buffer TAG signal, as used in FIG. 5.
Figure 8:
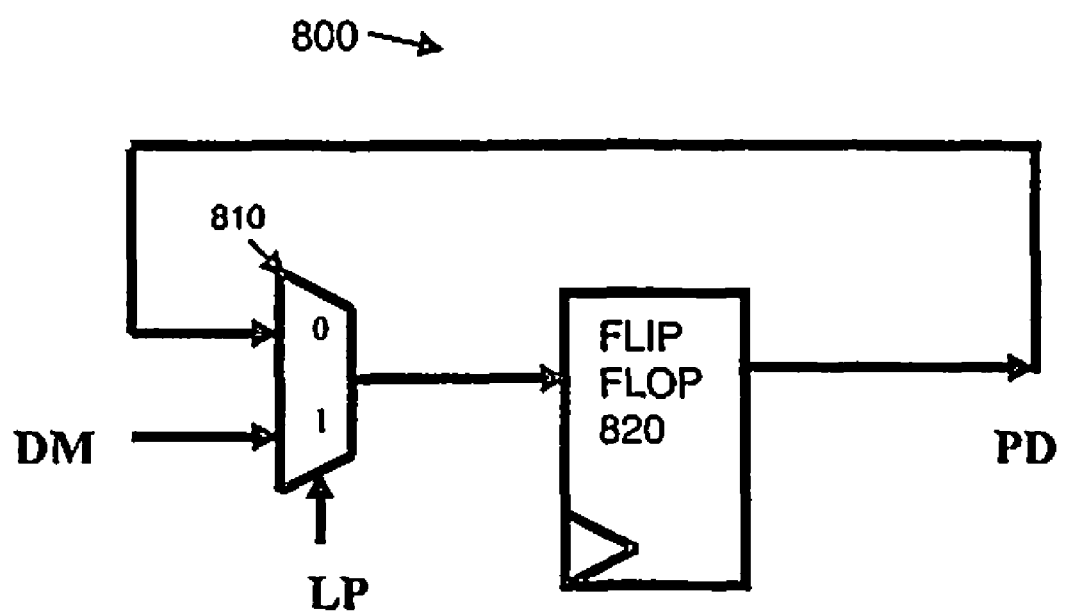
FIG. 8 shows a circuit for the generation of the Predict buffer Data signal.

Circuits 600, 700 and 800 for the generation of control signals PV, PT, and PD respectively for updating the above three fields according to the first embodiment are illustrated in FIGS. 6 to 8.

Referring first to FIG. 6: Predict-buffer valid (PV) is set and held in flip-flop 650 by circuit 600 when Load Predict buffer (LP from FIG. 4) is asserted (via OR gate 630) and is cleared (via a low input to AND gate 640 from inverter 620) when predict-fetch memory (PM from FIG. 3) is asserted or when predict-fetched data in the predict buffer 150 is moved from Predict Buffer to a cache line (DU) as determined by OR gate 610.

Referring next to FIG. 7; a new predict buffer tag is loaded by circuit 700 from signal CT via multiplexer 710 into the predict buffer TAG flip-flops 720 each time a predict-fetch from memory is signalled by selection input PM (see FIG. 3) to multiplexer 710. It should be noted that the TAG is only valid when the Predict-buffer Valid (PV) signal (see FIG. 6) is asserted.

Referring lastly to FIG. 8; predict-fetched data DM is loaded from the main memory 140 via multiplexer 810 into the predict buffer flip-flops 820 by circuit 800 each time the Load Predict-fetch Buffer signal is signalled by selection input LP (see FIG. 4) to multiplexer 810. As with PT (FIG. 7), data is only valid when the predict-buffer valid (PV) signal (see FIG. 6) is asserted.

Further, according to the first embodiment, the cache 125 compares the TAG of a requested cache block with the TAG of the predict buffer 150 whenever a miss occurs. If the two TAGs match, the predict buffer 150 has the requested data in it, so the data in the predict buffer 150 is moved to a cache line within cache 125 to which a conventional replacement algorithm points. The signal DU is then asserted, causing circuit 600 (FIG. 6) to indicate via signal PV that the data in the predict buffer 150 is invalid.

According to the first embodiment, circuits 300, 400, 500, 600, 700, and 800 are part of the cache 125. In other embodiments, parts of the predict-fetch circuitry could be replaced by software instructions running on the processor 110 associated with the system 100.

In yet other embodiments, the cache can be a direct mapped, n-way set associative, or fully associative cache.

In yet other embodiments, the predict method is used for both Instruction and Data caches. Since the occurrence of sequential accesses is more common for Instructions, the Instruction Cache should have a smaller threshold value (TH) than the Data Cache for optimal operation.

Figure 9:
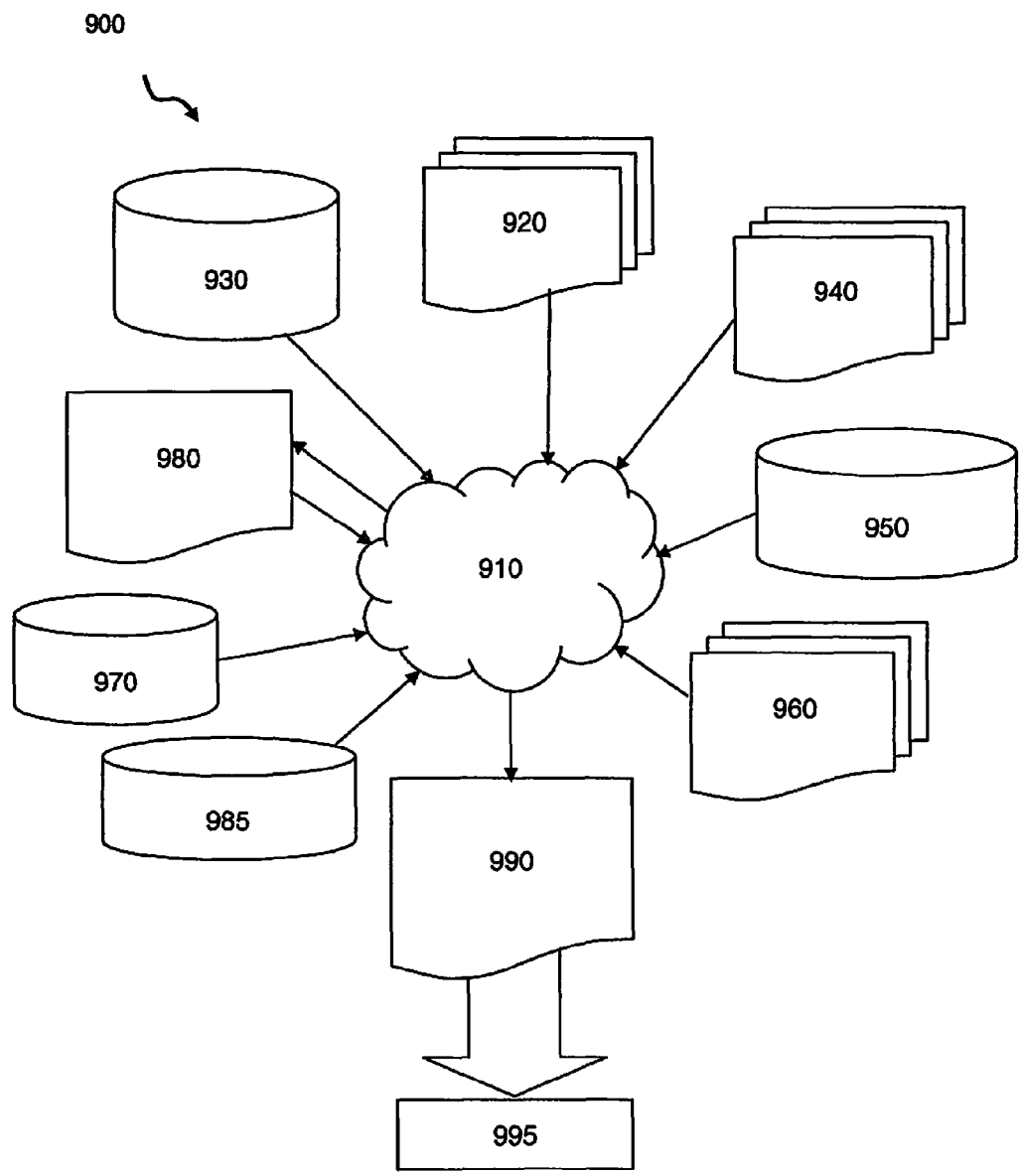
FIG. 9 is a flow diagram of a design process used in semiconductor design, manufacture, and/or test.

FIG. 9 shows a block diagram of an exemplary design flow 900 used for example, in semiconductor IC logic design, simulation, test, layout, and manufacture. Design flow 900 includes processes and mechanisms for processing design structures to generate logically or otherwise functionally equivalent representations of the embodiments of the invention shown in FIGS. 2-8. The design structures processed and/or generated by design flow 900 may be encoded on machine-readable transmission or storage media to include data and/or instructions that when executed or otherwise processed on a data processing system generate a logically, structurally, or otherwise functionally equivalent representation of hardware components, circuits, devices, or systems.

FIG. 9 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 2-8. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 2-8 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium. The medium may be a non-volatile storage medium such as a magnetic or optical disk drive, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include modules for performing standard circuit design processes such as timing analysis, verification, design rule checking, place and route operations, etc.

Design process 910 employs and incorporates well-known logic and physical design tools such as HDL compilers and simulation model build tools to process design structure 920 together with some or all of the depicted supporting data structures to generate a second design structure 990. Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-8. In one embodiment, design structure 990 may comprise a compiled, executable HDL simulation model that functionally simulates the devices shown in FIGS. 2-8.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data processed by semiconductor manufacturing tools to fabricate embodiments of the invention as shown in FIGS. 2-8. Design structure 990 may then proceed to a stage 995 where, for example, design structure 990: proceeds to tape-out, is released to manufacturing, is released to a mask house, is sent to another design house, is sent back to the customer, etc.

The foregoing describes only some embodiments of the present invention, and modifications and/or changes can be made thereto without departing from the scope and spirit of the invention, the embodiments being illustrative and not restrictive.

I claim:

1. A cache memory comprising:
   one or more cache lines of equal size, each said cache line adapted to store a cache block of data from a main memory in response to an access request from a processor; and
   a predict buffer, of size equal to the size of said cache lines, configured to store a next block of data from said main memory in response to a predict-fetch signal generated using at least one previous said access request to the same cache block in said cache memory, wherein said next block of data from said main memory having an address next to an address of said same cache block in said memory;
   wherein said predict-fetch signal is generated by comparing a number of successive cache hits generated by said access requests from said processor to said same cache block with a predetermined threshold and asserting said predict-fetch signal based on said comparison, wherein said generating further comprises comparing, if an access request by said processor generates a cache miss, an address of a requested cache block with an address of the cache block in said predict buffer and moving the cache block in the predict buffer to one of said cache lines based on said comparison, wherein if a predict-fetch from the main memory is in progress, the number of the successive cache hits is reset.

2. The cache memory of claim 1, wherein said predict-fetch signal is not asserted if said next cache block is already stored in a cache line of said cache memory.

3. The cache memory of claim 1, wherein said predict-fetch signal is not asserted if said next cache block is already stored in said predict buffer.

4. The cache memory of claim 1, wherein said data from said main memory comprises instructions for said processor.

5. A method of storing a block of data in a cache memory, said method comprising:
   comparing a number of successive cache hits generated by access requests from a processor to the same cache block already stored within said cache memory with a predetermined threshold, and
   storing, based on said comparison, a next block of data from a main memory in said cache memory, said next block having an address next to the address of said same cache block in said main memory, wherein said next block of data is stored in a predict buffer in said cache memory, wherein the cache memory comprises one or more cache lines, and wherein said predict buffer is of size equal to a size of each of the cache lines in said cache memory, wherein if a predict-fetch from the main memory is in progress, the number of successive cache hits is reset; and
   comparing, if an access request by said processor generates a cache miss, an address of a requested cache block with an address of the cache block in said predict buffer and moving the cache block in the predict buffer to one of said cache lines based on said comparison.

6. The method of claim 5, wherein said next block of data is not stored if said next cache block is already stored in a cache line of said cache memory.

7. The method of claim 5, wherein said data from said main memory comprises instructions for said processor.

8. A design structure embodied in a non-transitory machine readable medium for designing, manufacturing, or testing an integrated circuit, the design structure comprising:
   one or more cache lines of equal size, each said cache line adapted to store a cache block of data from a main memory in response to an access request from a processor; and
   a predict buffer, of size equal to the size of said cache lines, configured to store a next block of data from said main memory in response to a predict-fetch signal generated using at least one previous said access request to the same cache block in one of said cache lines, wherein said next block of data from said main memory has an address next to an address of said same cache block in said main memory, wherein said predict-fetch signal is generated by comparing a number of successive cache hits generated by said access requests from said processor to said same cache block with a predetermined threshold and asserting said predict-fetch signal based on said comparison, wherein said generating further comprises comparing, if an access request by said processor generates a cache miss, an address of a requested cache block with an address of the cache block in said predict buffer and moving the cache block in the predict buffer to one of said cache lines based on said comparison, wherein if a predict-fetch from the main memory is in progress, the number of successive cache hits is reset.

* * * * *